US008645006B1

(12) United States Patent
Masson

(10) Patent No.: US 8,645,006 B1
(45) Date of Patent: *Feb. 4, 2014

(54) ELECTRONIC KIT BAG

(76) Inventor: Angela Masson, St. Augustine, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,197

(22) Filed: May 23, 2011

Related U.S. Application Data

(60) Continuation of application No. 11/501,516, filed on Aug. 9, 2006, now Pat. No. 7,970,531, which is a division of application No. 09/699,963, filed on Nov. 5, 1999, now Pat. No. 7,974,775.

(51) Int. Cl.
*G06F 15/00* (2006.01)
(52) U.S. Cl.
USPC .............................. 701/3; 701/528; 342/26 B
(58) Field of Classification Search
USPC ..................... 701/3, 528; 342/26 B
See application file for complete search history.

(56) References Cited

U.S. PATENT DOCUMENTS

| | | | | |
|---|---|---|---|---|
| 3,668,403 A * | 6/1972 | Meilander | | 701/121 |
| 3,979,057 A * | 9/1976 | Katz et al. | | 708/130 |
| 4,086,632 A | 4/1978 | Lions | | |
| 4,413,316 A * | 11/1983 | Blue et al. | | 701/3 |
| 4,642,775 A * | 2/1987 | Cline et al. | | 701/200 |
| 4,774,670 A * | 9/1988 | Palmieri | | 701/3 |
| 4,825,381 A * | 4/1989 | Bottorf et al. | | 701/532 |
| 5,041,982 A | 8/1991 | Rathnam | | |
| 5,220,507 A | 6/1993 | Kirson | | |
| 5,673,628 A * | 10/1997 | Boos | | 108/44 |
| 5,883,586 A | 3/1999 | Tran et al. | | |
| 5,944,791 A * | 8/1999 | Scherpbier | | 709/218 |
| 5,999,480 A * | 12/1999 | Ong et al. | | 365/230.06 |
| 5,999,882 A * | 12/1999 | Simpson et al. | | 702/3 |
| 6,005,513 A * | 12/1999 | Hardesty | | 342/357.34 |
| 6,259,988 B1 | 7/2001 | Galkowski et al. | | |
| 6,278,283 B1 | 8/2001 | Tsugau | | |
| 6,380,869 B1 * | 4/2002 | Simon et al. | | 340/945 |
| 6,424,355 B2 | 7/2002 | Watanabe et al. | | |
| 6,466,235 B1 * | 10/2002 | Smith et al. | | 715/771 |

* cited by examiner

*Primary Examiner* — Tuan C. To
(74) *Attorney, Agent, or Firm* — Maier & Maier, PLLC

(57) ABSTRACT

The Electronic Kit Bag (EKB) is a computerized, portable pilot "kit bag" that accepts input data, manipulates said data, and outputs solutions. The EKB consists of standard and state-of-the-art computer parts and peripherals, interfaced for maximum utility. The central operating program of the device assesses the relationships of input data through logic based, three-dimensional decision-making algorithm. Data output is utilized either directly by the user, by the user through an aircraft system, or directly from the EKB to an aircraft system or autopilot.

25 Claims, 7 Drawing Sheets

Basic E.K.B.
computing device -
sample configuration and components

Additional ergonomic design

ELECTRONIC KIT BAG

RELATED APPLICATIONS

This application is a continuation of U.S. patent application Ser. No. 11/501,516, filed Aug. 9, 2006, which is a divisional of U.S. patent application Ser. No. 09/699,963, filed Nov. 5, 1999, the contents of which are incorporated herein, in their entireties, by reference thereto.

FIELD

This invention relates in general to computers, and, in particular, to the processing and translating of transportation data and functions through linear and non-linear methodologies into active operating parameter.

BACKGROUND

The historical development of this invention, the EKB, can be examined from three general perspectives: (1) weight; (2) utility; and (3) function.

1. Kit Bag Weight

Pilots, and other transportation professionals, routinely carry extremely heavy bags, full of paraphernalia specific to their art, including maps, calculators, logs, charts, navigation instruments, and so on. This bag is usually referred to as a "kit bag" and generally, for an aviation professional, for example, weights between 30 and 80 pounds. According to FAA Medical and Workman's Compensation statistics, the most common loss of work time, on the job injuries, in this work group are related to moving, carry and stowing the "kit bag": torn shoulder ligaments, dislocated elbows, "slipped disk" back problems, and knee joint problems.

The problem of the heavy kit bag/injured pilot has been attempted to be solved by at least one other means, adding wheels and a handle to the kit bag, roller-suitcase style.

The following invention was originally conceived with the intention of simply solving the weight problem, as the entire contents of a traditional kit bag can be reduced to an electronic equivalent of about 3-7 lbs. However, in developing the project, other innovative and highly functional properties became apparent.

2. Utility

The current kit bag can be compared to a cumbersome sideways drawer. An area is generally left in the cockpit, to the right or left of the pilot, where the kit bag can be placed. In flight, if an item is needed from the kit bag, there often ensues an unpacking, rummaging and hunting expedition into the kit bag for the sought after manual, tool, chart, log or other desired item. The pilot is taken out of the flying-loop while this hunting expedition is in progress. Another draw-back of the old-fashioned kit bag is the traditional coffee-spill. Coffee-cup holders in the cockpit are generally placed right above the kit back stowage compartment. A kit bag is not considered "broken in" until at least one cup of coffee, orange juice or other non-paper friendly liquid has spilled into the contents of the kit bag and ruined the most important documents needed for the flight in progress, as well as any other important paperwork contained therein.

Further, the traditional kit bag must be hauled around like an additional suitcase. It is here that most on-the-job injuries occur: removing the kitbag from too tight of a storage area, heaving it into overhead bins, lifting it in and out of vans and storage facilities.

The utility problem has heretofore not been successfully addressed. Although, traditionally kit bags are made in various shapes and from various sorts of materials (including tin, plastic-covered card-board, canvas, etc.), they all only serve to hold contents in a standard method with the result being bulky, cumbersome and heavy.

The EKB approaches the problem from another perspective. By changing the contents of the kit bag, the nature of the exterior of the "bag" is also modified. The E6-B slide rule is a device, for instance, which can eliminate some wind charts and solve some airspeed/ground speed calculations. The handheld calculator, designed for the same function, was an electronic advancement, as is the Performance Management System, an integrated on-board aircraft system. Although these devices may individually partially contribute to certain aspects of a kit bag's contents and function (See Section 3 below), none address the concept of deleting the load or form of the kit bag in any way, let alone the entirety of all functional aspects of a kit bag. The EKB is light weight and easily manipulated. It can be moved without undue stress, strain or physical contortion. In use, it will not be below the coffee holders! Less physical storage place is needed, resulting in more cockpit room. Also, less weight is carried on-board, resulting in substantial and measurable fuel savings.

3. Function

As mentioned, with the traditional kit bag, the pilot must rummage through the contents in search of the needed material(s), taking the pilot out the immediate operating loop, and costing precious time, especially in an emergency. Often needed particulars are located in separate and disparate areas. The pilot may need to consult one manual for operating parameters, another book of charts for an off-line emergency airport, another manual for the emergency procedure, while simultaneously talking with dispatch or operations on a radio. The other pilot (in generally two-person airline crew) is left alone to fly a possibly crippled airplane, talk to the flight attendants and passengers, and negotiate with air-traffic control.

Few attempts have been made to alleviate the duress caused by this plethora of unrelated information presented in physically unrelated forms. One limited suggestion known to this inventor was an on-board type computer which used an aircraft up-link device to manage charts. This failed FAA certification, however, partly because it relied on aircraft power. The EKB, while providing much more information as well as information processing, relies on internal battery power (although it can be "charged" from aircraft power as well). The FAA has provided, incidentally, provisional operating permission for use of the EKB on-board.

The EKB requires learning only simple key-stroke patterns to be a superior replacement for the traditional kit bag and contents in many operating situations. Optimal functionality is acquired when all mentioned inputs are interfaced and electronically "evaluated." Several steps can be incorporated in one or a few input strokes from a proficient operator.

Additionally, the EKB has the potential capability to actually "fly" the aircraft within certain parameters to a touch-down and landing.

A major improvement over the traditional "kit bag" is that the computerized version can manipulate data in a non-linear algorithm, aggregating and sorting choices, thereby aiding in decision-making processes resulting in solutions to mathematical computations, runway selection, operating parameters, figuring pilot fatigue limits and scheduling issues. Output solutions can be interfaced with the craft, auto-pilot style, so that a craft could be manipulated through the EKB via radio/satellite/other mode transmissions by a ground operator in certain emergencies, such as crew incapacitation.

OBJECTIVES

It is the principal object of the current invention to create a device which, through the amalgamation and formalization of disparate operating data into a functional methodology that can then translated quickly and easily into today's operating environment, will not only make a pilot's overburdened job easier, but save lives.

RELATED ART

In order to provide background information so that the invention may be completely understood and appreciated in its proper context, reference is made to a number of prior art patents and publications as follows:
  computers
  calculating devices
  radios
  printers
  autopilots
  radio-controlled aircraft/missiles Whatever the precise merits, features and advantages of the above cited references, none of them achieve or fulfills the purposes of the present invention.

SUMMARY

Other than through exterior suit-case like changes, organizing the contents of the standard pilot kit bag into a more manageable, user friendly format has not been attempted.

Coalescing and analyzing kit bag data electronically is a modern and sensible solution to the both the problems of physical ungainliness and practical application of the standard kit bag. Additionally, the problem of aircraft control during pilot incapacitation has also been inadequately addressed by any means other than self-help (oxygen use) or on-board autopilot capabilities. Heretofore there has been no device which offers a simultaneous, practical and coherent solution for either problem. The electronic, computerized portable kit bag (EKB), offers solutions to both problems in a single package.

The present invention is a portable, computerized, electronic kit bag (EKB) consisting of standard and state-of-the-art computer parts and peripherals, interfaced for maximum utility. The EKB has a central operating program which assesses the relationships of input data through a three-dimensional logic based decision-making algorithm and has output formatted to be utilized either directly by the end user, an intermediate user, by a user through an aircraft system, or directly from the device to an aircraft system or autopilot.

BRIEF DESCRIPTION OF THE FIGURES

Advantages of embodiments of the present invention will be apparent from the following detailed description of the exemplary embodiments thereof, which description should be considered in conjunction with the accompanying drawings in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention.

The EKB requires learning only simple key-stroke patterns to be a superior replacement for the traditional kit bag and contents in many operating situations. Optimal functionality is acquired when all mentioned inputs are interfaced and electronically "evaluated." Several steps can be incorporated in one or a few input strokes from a proficient operator. Additionally, the EKB has the potential capability to actually "fly" the aircraft within certain parameters to a touch-down and landing.

A major improvement over the traditional "kit bag" is that the computerized version can manipulate data in a non-linear algorithm, aggregating and sorting choices, thereby aiding in decision-making processes resulting in solutions to mathematical computations, runway selection, operating parameters, figuring pilot fatigue limits and scheduling issues. Output solutions can be interfaced with the craft, auto-pilot style, so that a craft could be manipulated through the EKB via radio/satellite/other mode transmissions by a ground operator in certain emergencies, such as crew incapacitation.

The portable, computerized electronic kit bag (EKB) consists of standard and state-of-the-art computer parts and peripherals, interfaced for maximum utility. The EKB can be constructed similarly for several end user/operators, including captains, pilots, commanders, drivers, dispatchers and operations personnel of boats/ships, automobiles, aircraft, spacecraft and other transportation devices. The example used here will apply to the pilot of an airliner.

Figure 1:
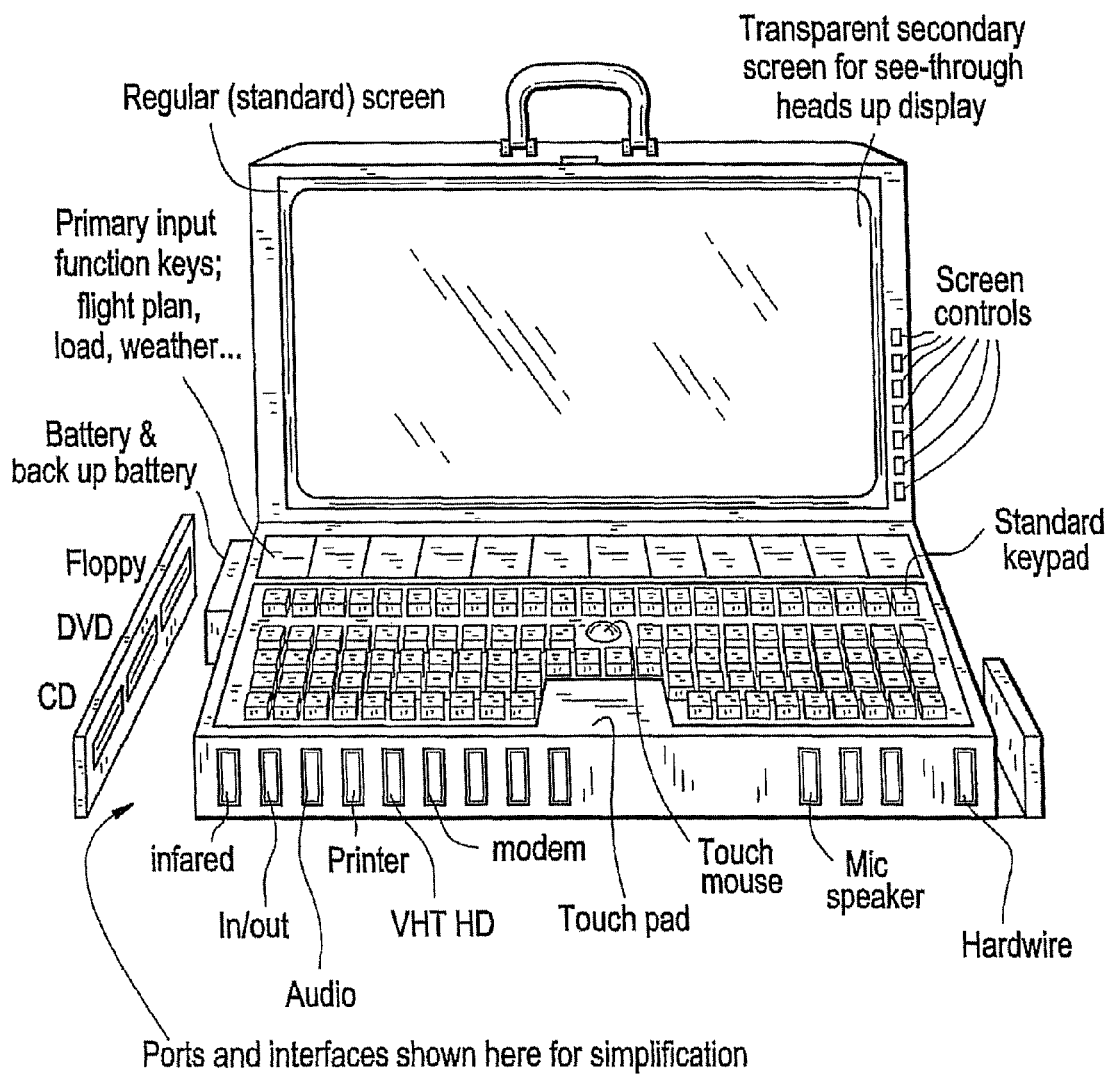
FIG. 1 is a front exterior view of an exemplary laptop-style EKB.
Figure 2:
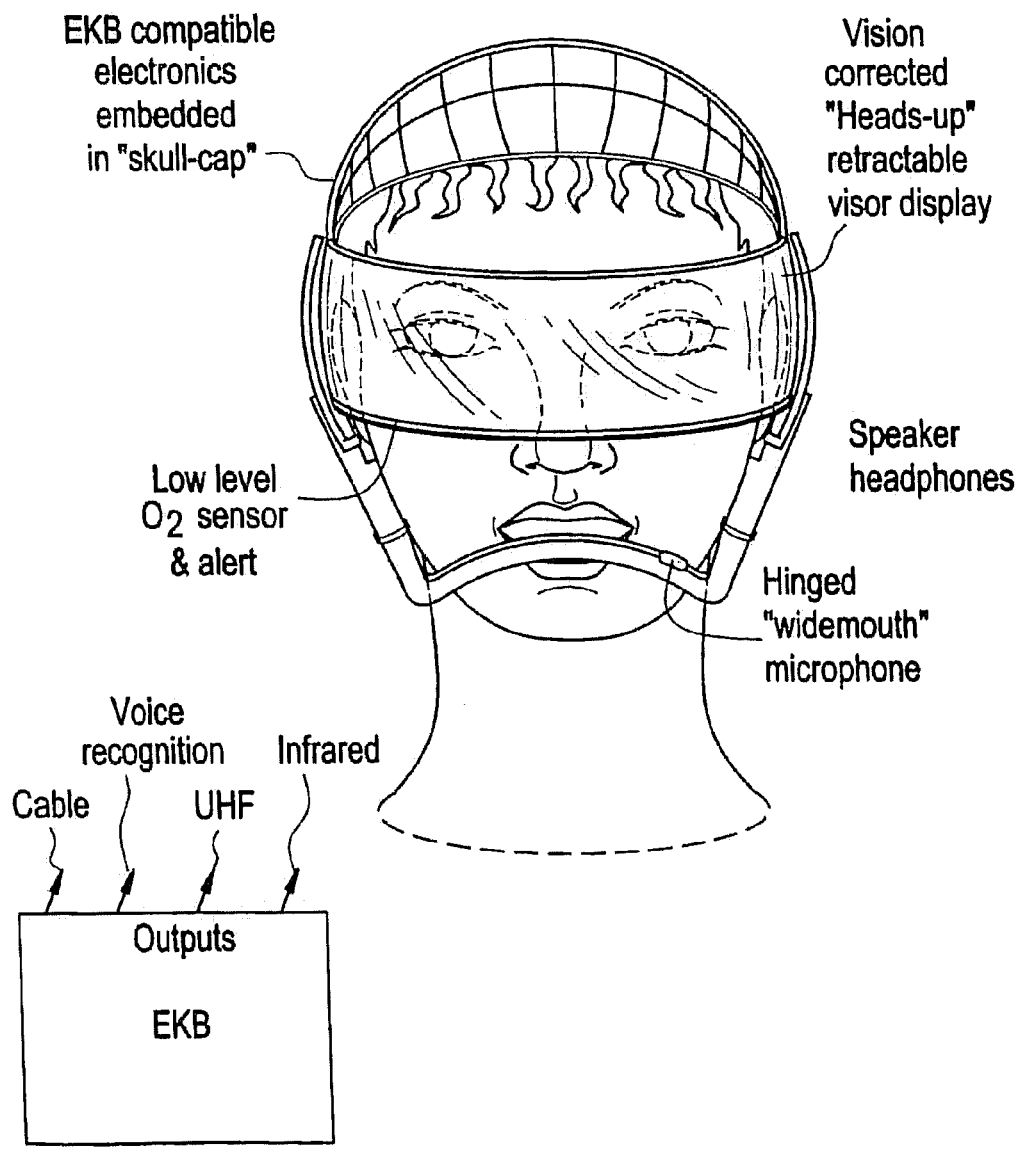
FIG. 2 is a front exterior view of an exemplary "all-in-one" interactive headgear EKE interface.
Figure 3:
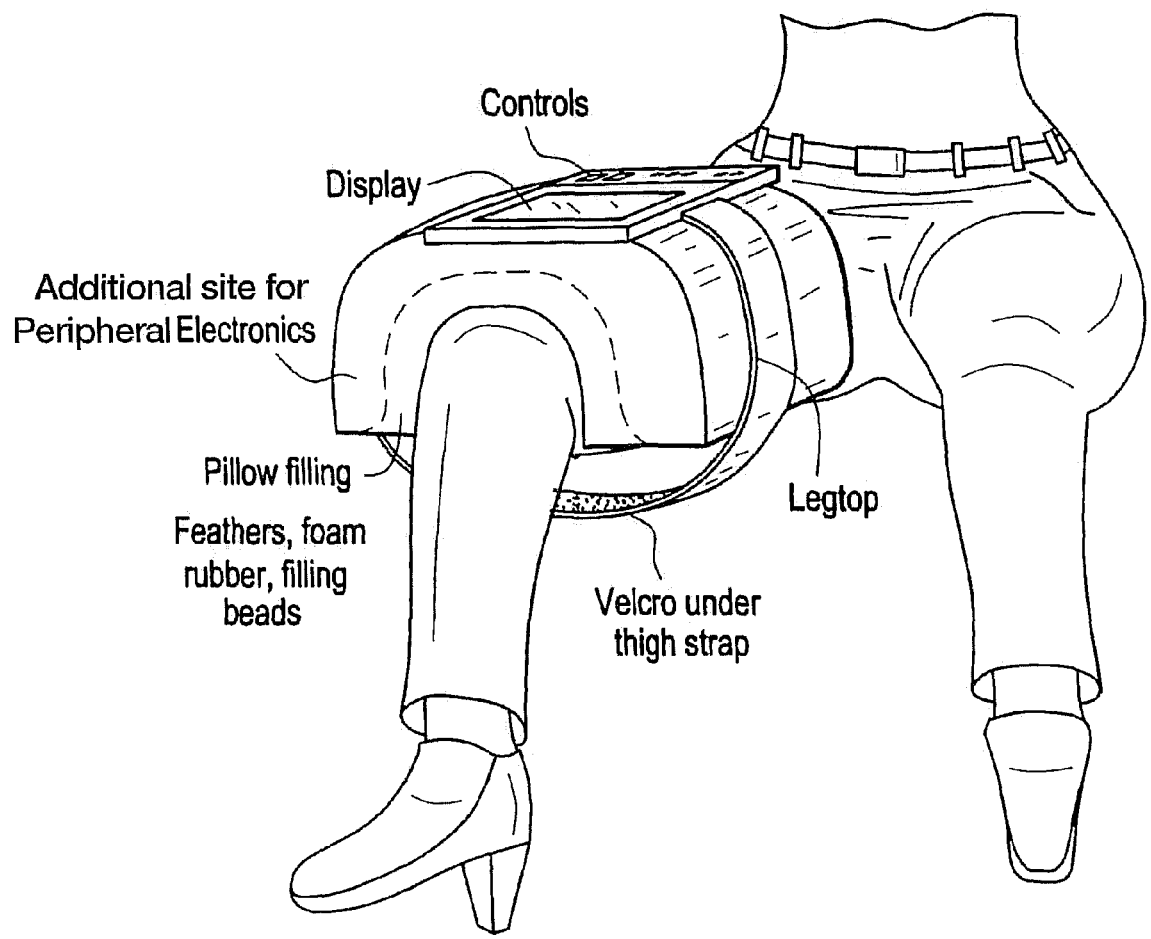
FIG. 3 is an exterior view of an exemplary ergonomically-designed EKB attached to the leg of a user.

The computer itself is a laptop type, or ergonomic variation thereof, such as a knee-top style (FIG. 3). Enhancements include a translucent secondary window designed for the purpose of overlaying "heads-up" display information directly over maps, charts or other data displayed by a primary computer screen (FIG. 1). Peripherals include printers, zip-drives, and other standard or non-standard computer devices. The all-in-one interactive headgear which interfaces with an EKB (FIG. 2), is a sample non-standard peripheral.

Input is acquired online or off-line through modem, cable, direct input, CD, DVD, floppy disk, voice recognition, infra red, radio (UHF, VHF), computer linking, video, digitally, scanning or any accessible and/or compatible means, internet and intranet systems included.

The nature of input data and sources can be typical and/or operationally unusual. This "parent" system is linked with other extant operating systems and data bases, such as reservations, meteorological, dispatch (routing, diversion and alternate planning), load planning, scheduling, airplane operating parameters, aircraft instruments and related systems (engine, hydraulic, GPS, inertial, radar, GPWS, collision avoidance, etc.), FAA crew rest and duty limits, union regulations and rules, charts/maps, log-books, airport analyses and any and all other links and data that may be made available to computer acquisition.

Figure 4:
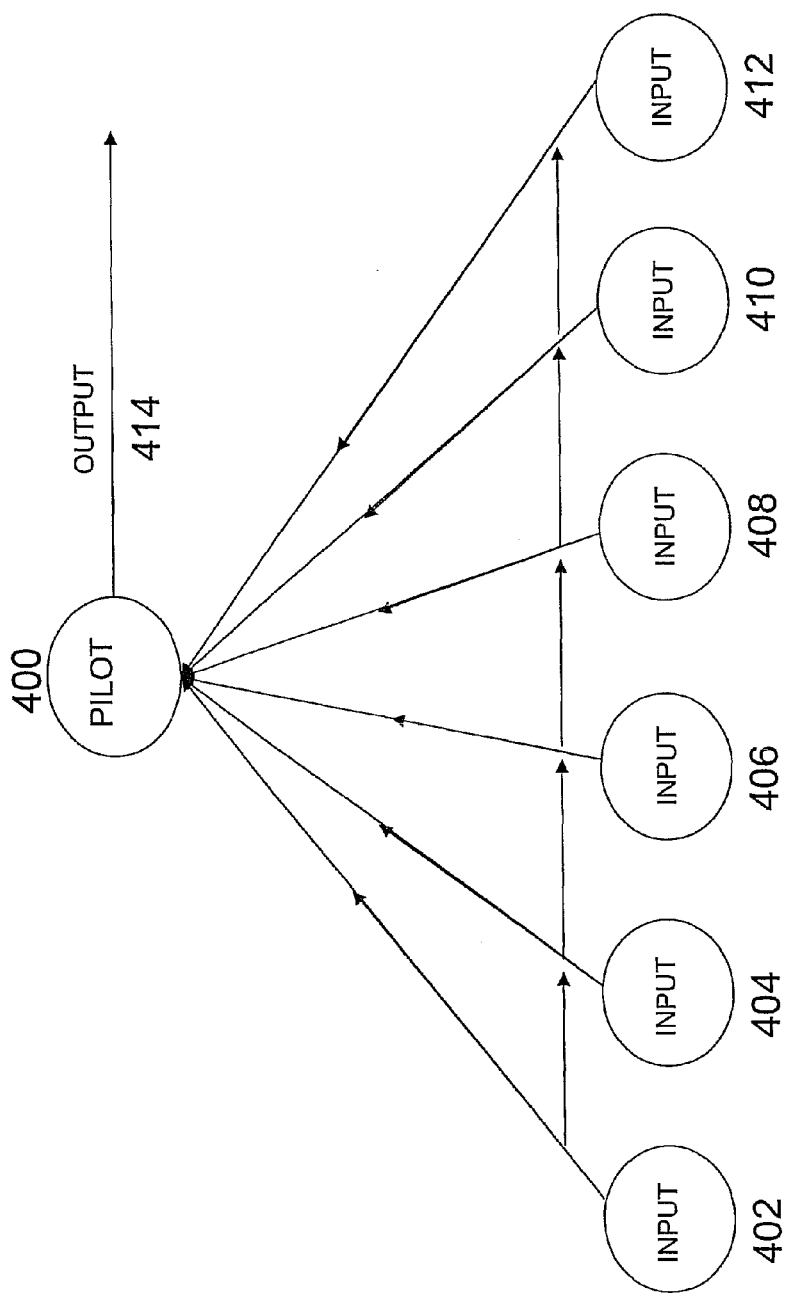
FIG. 4 is an exemplary diagram showing an exemplary prior art decision-making process.
Figure 5:
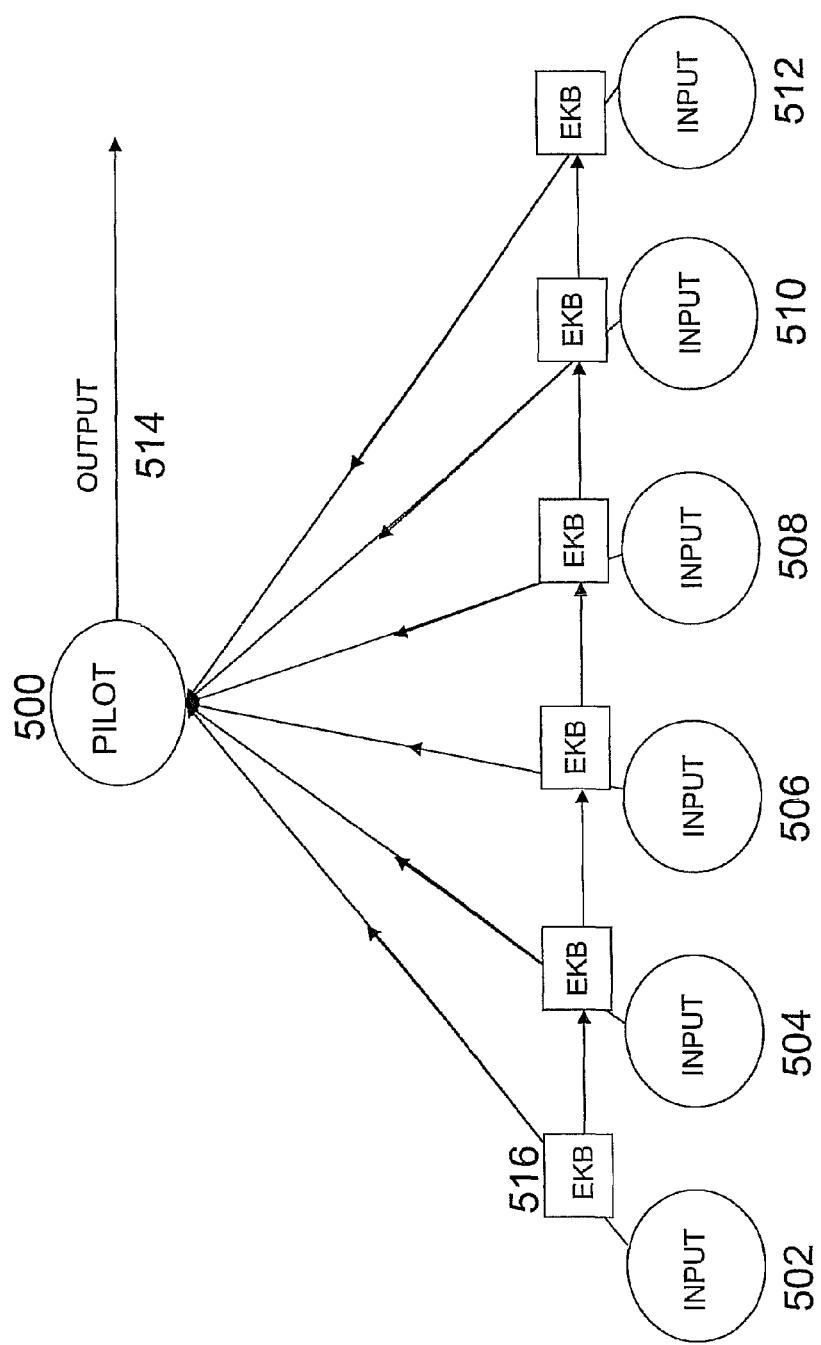
FIG. 5 is an exemplary diagram showing a matrix decision-making process for use by a transportation professional according to an exemplary embodiment.
Figure 6:
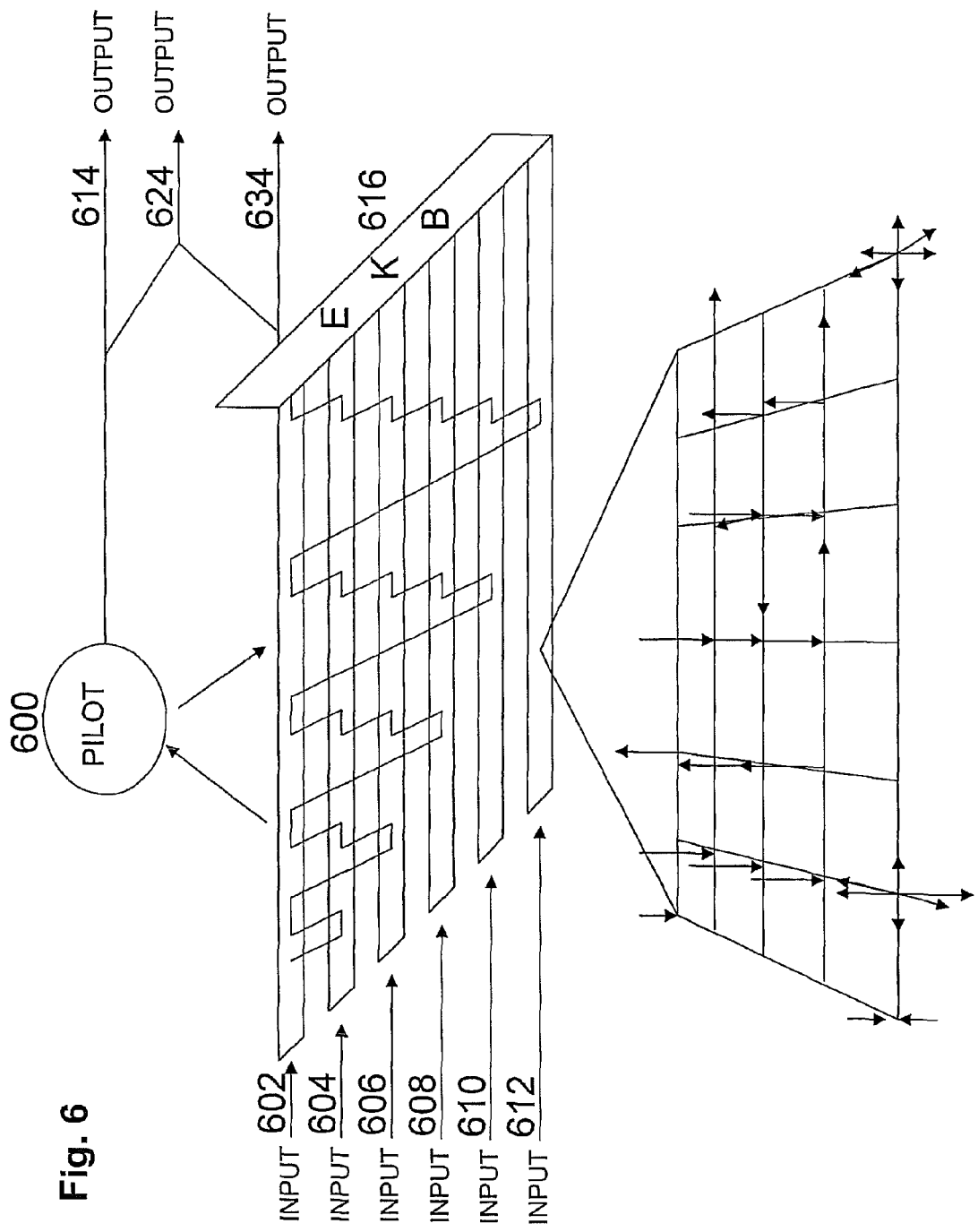
FIG. 6 is an exemplary diagram showing a three-dimensional decision-making process for use by a transportation professional according to another exemplary embodiment.

Input is manipulated internally and integrated through traditional linear, "matrix," or multi-level, cross-access "texotrix" methodology (described below). In the embodiment depicted in FIG. 6 the central operating program assesses the relationships of input data through a three-dimensional logic based decision-making algorithm. FIGS. 4, 5 and 6 provide the user with up-to-the-minute, operating information available for pre-flight, en route, post flight or future operations. The pilot can access incremental feedback, monitor, or make adjustments at any point. Processing includes recording, coping, filing, updating, organizing, printing, and generating data, literature, schedules, routing, planning, computations and permutations of all phases of the flight needed at any given point in time.

The processing algorithm operates as follows (for example): a unit of data, or calculation, is presented as input (the wind is 240/10) the result can be accessed immediately, (suggested runway at ORD is 22) or modified by adding another unit of data, or calculation (ice accumulating rapidly) with the result again capable of being accessed, (runway 32 longer, suggested better choice, in spite of wind) or modified (crew legality reaching hourly limit) results available, (runway 27 adequate, quicker access, legal compromise) or modifiable . . . (left wing heat becomes inoperative) and so on. See FIG. 6 for how the system can "think" and interpolate unrelated data sources.

Process information is presented as factual output usable to determine operating options: formula calculations to aid in decision-making and suggested "best choice" solutions.

Output solutions can include flight planning, en route decision making moderated by weather and operating factors, financial analyses of integrated choices, fuel computations, weight-and-balance, crew planning, passenger accommodation/satisfaction result prognostication, and statistics relating to associated elements of an on-time/safe flight/travel operation, and so on.

Output can be presented directly or indirectly, electronically, graphically, printed or displayed on the system screen, or through associated systems by way of cable, infra-red, printer, modem, wireless or any other compatible or available output transfer system.

Figure 7:
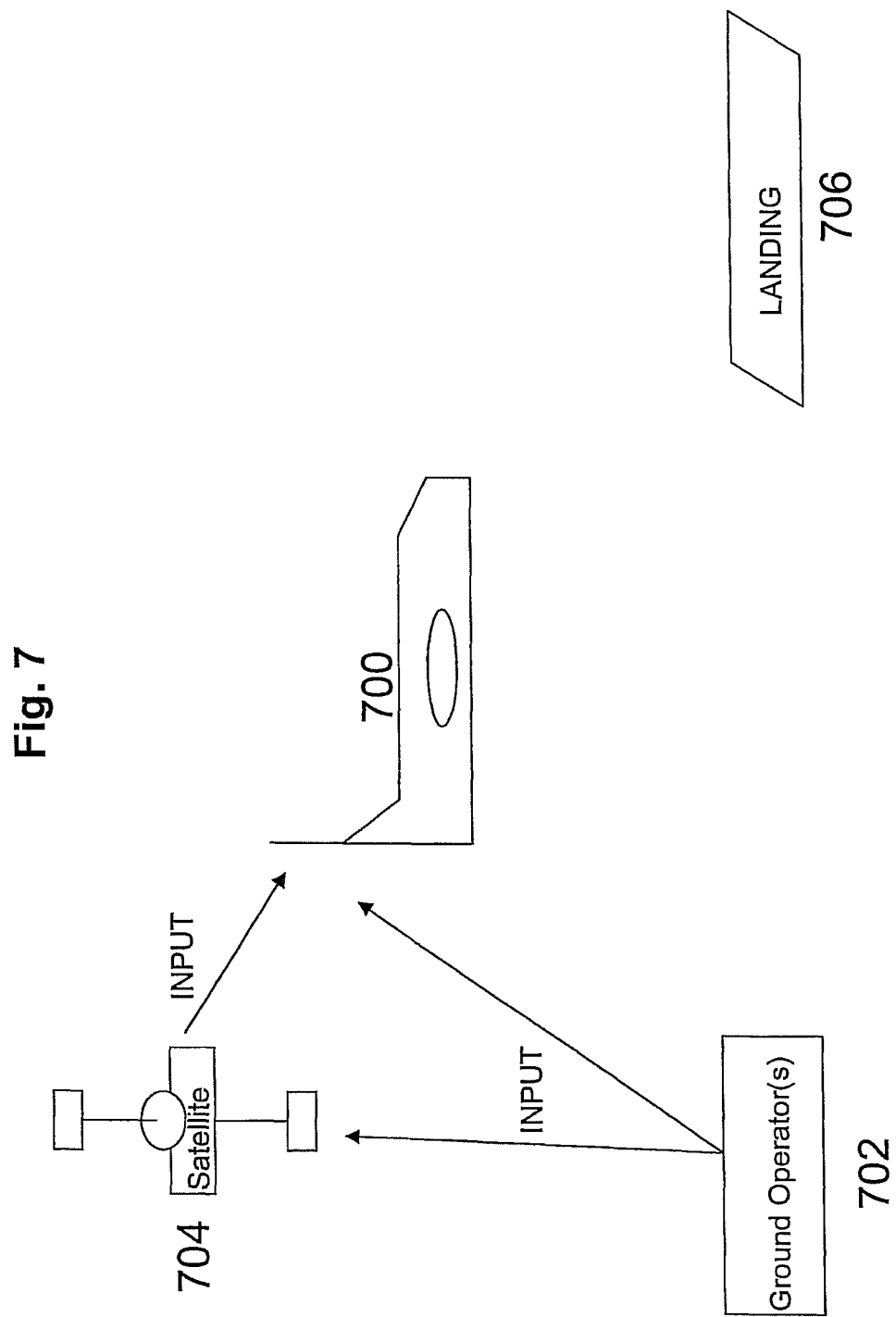
FIG. 7 is an exemplary diagram depicting a potential application of an EKB as part of a system for active control of an operating transportation craft.

The EKB data output is formatted to be utilized either directly by the end user, an intermediate user, by a user through an aircraft system, or directly from the device to an aircraft system or autopilot. The EKB includes the capability of being interfaced directly with the aircraft, auto-pilot style, through "hard-wired" cable (by plugging a unit connector cable directly into the autopilot or specific system computer bay), cable-free infrared (for systems so modified to assure compatibility), electronic or other information exchange systems. FIG. 7 is an exemplary diagram of the process defined by the transmittal of data from a Ground Based Operator System 702, through an on-board combined-functions device in Operating Transportation Craft 700, resulting in the manipulation or active control of Operating Transportation Craft 700 that can be established in the following manner: an EKB interfaced with Operating Transportation Craft 700 includes receptivity to input in the form of voice activated commands or electronic data transfer from either Ground Operators 702 or Satellite 704 solely or in conjunction, and can output directly to aircraft control systems. Thus, functional radio control of the aircraft can be established from ground based personnel or equipment in emergency situations, such as pilot incapacitation.

FIG. 4 shows a current standard for a linear (i.e. one dimensional) decision-making process used by a transportation professional such as a pilot. Pilot 400 receives information as Input 402 from flight operations regarding a flight plan which includes departure point, destination, alternate airports, and fuel time. Pilot 400 then reviews and uses the information leading to Output 414; then Pilot 400 acquires a weather briefing as Input 404. Then that information is used by Pilot 400 leading to Output 414; then Pilot 400 acquires information about crew scheduling and other limitations regarding the time the crew has been on duty for this particular mission as Input 406. Additionally, Pilot 400 acquires maintenance information about the plane from the log book on the airplane, from pilot briefings and/or from the mechanics as Input 408. Additionally, information as Input 412 is obtained about passenger concerns, e.g. particular passenger information as well as the passenger manifest and information as Input 410 about the cargo, e.g., types of cargo, restricted items, livestock, etc. With this information, as it comes incrementally and linearly to Pilot 400, Pilot 400 makes modified decisions about the flight as Output 414.

FIG. 5, improvement No. 1, is a diagram showing a matrix (i.e. two-dimensional) decision-making process for use by a transportation professional such as a pilot. Information such as Input 502 is acquired by Pilot 500, as additional information such as Input 504 is given to Pilot 500, the prior information learned from Input 502 by Pilot 500 is used in supplying the next new information from Input 504 to Pilot 500. So that, for example, the first linear information received as Input 502 by Pilot 500 would be the flight operations in this example, before the next information from Input 504 is given to Pilot 500, the weather information from Input 504 given to Pilot 500 is adjusted (e.g., Input 504 is modified by an EKB rendering calculations) based on the flight operation from Input 502 so that Pilot 500 can either access the information directly as Input 502, e.g., from flight operations, or he can access the weather information from Input 504 so that the flight plan from Input 502 is modified by the influence of the weather information. Likewise, when the third element is added as Input 506, for example, crew limits, when that information is fed to Pilot 500, an EKB can modify or suggest a flight plan to be within the limits of the crew. Specifically, this improvement No. 1 ensures that the crew limits from Input 506 will be taken into consideration notwithstanding whether Pilot 500 was thinking about that particular limitation or any of the other limitations or data being fed to him. The program figures the limits based on the flight operations plan from Input 502 in the particular circumstances. For example, there are different limits based on whether the flight is domestic or international. Specifically, a crew may only have a certain amount of time left on that leg of the trip which may be shorter than the flight mission which could present a problem to Pilot 500. This improvement No. 1 takes into consideration the crew limits from Input 506 whether or not Pilot 500 actually considered the same and this way the improvement No. 1, flight operations plan from Input 502 is adjusted according to the weather from Input 504, the crew limits from Input 506, the maintenance from Input 508, the load from Input 510 and the passengers from Input 512. Another example is for the load from Input 510. The final weight and load of the plane and passenger quantity under some circumstances is figured out by a pilot especially including variables such as fuel, weather and destination.

Under this improvement No. 1 system, for example, if at the time of take off it was starting to rain and it was necessary for Pilot 500 to figure out a new runway length as Output 514, all these calculations can be done by the computer and assessed in real time leading to Output 514 as opposed to having Pilot 500 have to research his individual paper manuals as it is presently done for new factors in view of the rain in regard to, for example, take off length, runway length, speed of the airplane under moisture conditions and other adverse conditions. Improvement #1 cumulative adds step by step information, modifying the result mechanically as needed.

FIG. 6, improvement #2, is a diagram showing a texotrix (i.e. three-dimensional) decision-making process for use by a transportation professional such as a pilot, wherein the point of analysis/re-analysis of input/output can occur at any point. Computer System 616 generally returns to the beginning step and reassesses all factors based on all present factors from Inputs 602, 604, 606, 608, 610 and/or 612 that System 616 knows, such that the points of analysis made by System 616 for use by Pilot 600 is re-analyzed with the newest input and output that occurs at any point along the way. In this situation, Pilot can (Option 1) review the information and make a decision as Output 614, (Option 2) allow the computer to solve some of the questions and base decisions leading to Output 624 on personal knowledge and the information provided by the computer, or (Option 3) allow the computer to control and make the decisions as Output 634.

The use of the term "textorix" (L. texus, to weave, seen also in texture, textile, context and L.—trix, as in matrix) is that of the inventor, meaning an array of elements in rows, columns and stacks, treated as a unit using special algebraic laws in facilitating the study of relations between elements, used herein in reference to the processing of information in three dimensional levels.

In Summary, the present invention is a portable, computerized, electronic kit bag (EKB) consisting of standard and state-of-the-art computer parts and peripherals, interfaced for maximum utility, a central operating program which assesses the relationships of input data through a three-dimensional logic based decision-making algorithm, an EKB data output formatted to be utilized either directly by the end user, an intermediate user, by a user through an aircraft system, or directly from the device to an aircraft system or autopilot. A process defined by the transmittal of data from a ground based operator or system, through an on-board combined-functions device, resulting in the manipulation or active control of an operating transportation craft. Also an EKB may have a translucent secondary window designed for the purpose of overlaying "heads-up" display information directly over maps, charts or other data displayed by a primary computer screen; and an all-in-one interactive headgear interfaces with an EKB. Optionally an EKB may be in the form of an ergonomically designed knee-top style EKB.

The following discussion is a working example allowing a user, practicing at least one embodiment of the invention, to organize and manipulate disparate data and functions, and may consist of, inter alia, the following steps;
 (a) the electronic computational device is started;
 (b) the user selects the browser function;
 (c) the user selects from amongst a series of icons with linking capability to, for example, a connection function, a search function, a tools function, a programs function, or a control function;
 (d) the user selects an option from the browser, in this embodiment, SEARCH FUNCTION, and opens the program;
 (e) data is inputted into the search function by the user, in this embodiment, ENGINE OUT;
 (d) a list is presented with hyperlinked options, in this embodiment, AIRSPEEDS, ALTERNATE AIRPORTS, CHECKLISTS, LANDING WEIGHTS, REPORTS;
 (g) the user selects an option, in this embodiment, ALTERNATE AIRPORTS;
 (h) a list of alternate airports is displayed;
 (i) the user selects an alternate airport;
 (j) the data about that airport is displayed with additional links to related topics and functions, in this embodiment, CALCULATE TIME TO AIRPORT, CALCULATE FUEL TO THE AIRPORT; and
 (k) the user continues with the search tree, selecting another option or returns to the main menu, depending on the program and search function in use; alternatively,
 (l) when the user wants to make a calculation, data is inputted into the search function by the user, for example, ENGINE OUT;
 (m) a list is presented with hyperlinked options, in this embodiment, AIRSPEEDS, ALTERNATE AIRPORTS, CHECKLISTS, LANDING WEIGHTS, REPORTS;
 (n) the user selects an option, for instance, AIRSPEEDS;
 (o) a list is presented, in this embodiment, LANDING and GO-AROUND;
 (p) the user makes a selection, such as LANDING;
 (q) a list is presented of airspeed/landing functions, in this embodiment, REFERENCE SPEEDS
 (r) the user selects the desired function and inputs the prompted data, in this embodiment, WET/DRY;
 (s) the user continues to input prompted data, in this embodiment, WIND COMPONENT; and
 (t) the system calculates and outputs the needed airspeed;
 (u) the user may continue the search tree, select another option, or return to the main menu, depending on the program and search function in us; alternatively,
 (v) when the user wants to make a decision, data is inputted into the search function by the user, in this embodiment, ENGINE OUT:
 (w) a list is presented with hyperlinked options, in this embodiment: AIRSPEEDS, ALTERNATE AIRPORTS, CHECKLISTS, LANDING WEIGHTS, REPORTS;
 (x) the user selects an option, in the current embodiment, LANDING WEIGHTS;
 (y) a list is presented, in the current embodiment, CURRENT WEIGHT and CALCULATED WEIGHT;
 (z) data is outputted, in this example, LANDING WEIGHT IS 500,000 POUNDS, TOO HEAVY, DUMP FUEL;
 (a') the user is presented a decision-making option; alternatively,
 (b') when a user wants to make a report, data is inputted into the search function by the user, in this example, ENGINE OUT:
 (c'), a list is presented with hyperlinked options, in this example, AIRSPEEDS, ALTERNATE AIRPORTS, CHECKLISTS, LANDING WEIGHTS, REPORTS;
 (d') the user selects an option, continuing the search string, REPORTS;
 (e') a list is presented containing, in this example, ATC, COMPANY, OTHER AIRCRAFT;
 (f) the user makes a selection, in this example, COMPANY; and
 (g') continues to a screen for sending a report, if sending a report is required, the functioning program method will, in this embodiment;
  aid in composing the report;
  aid in addressing the report;

send the report in an email format;
selecting connectivity as hardwired or wireless, depending on the connectivity selected in this particular embodiment, which may be variable, depending on the choices of hardware and software; alternatively (i') when a user wants off-line training;

(j') data is inputted into the search function by the user, in this example, ENGINE OUT;

(k') a list is presented with hyperlinked options, as discussed above (l') the user selects an option;

(m') the selected option is outputted for study and review by the user.

The Electronic Kit Bag is conceived as a system that is not hardware, software, or component dependent, but rather conceptually and mechanically evolving, anticipating future incremental improvements, within the scope of the herein described purpose of the device, namely organizing, managing, manipulating, and outputting data, as well as integrating that data so that the device can be used as a portable interactive decision and support tool for flight operations, and even aircraft control. Accordingly, it is intended that this invention not be limited to these specific illustrative embodiments, but is to be interpreted within the full spirit and scope of the appended claims and their equivalents.

In summation, acknowledging that with the rapid advancement of technology, the precise hardware and software involved in this portable electronic flight system will evolve, but the integrity of the concept remains within the embodiment of the structure and methodology of this invention, and such variations are not to be regarded as a departure from the spirit and scope of the invention.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A portable, computerized system which accesses, organizes, manages, and manipulates flight data and functions, resulting in output displayed and accessible by a user, comprising:

a portable device having,
  hardware with a processor; memory; data input means, for permitting said user to input data; means for data manipulation; data access means for displaying data to said user; means for data recording and storage; and data output means for permitting said user to output data;
  a self-powering element for operating said device independent of a fixed power supply;
  a data input receiver that enables said portable device to receive data, wherein said data includes a first data from a data source in an input format and updated information;
  data delivery means for delivering said data to said portable device;
  software, including an operating system and operating program, wherein said software is stored within said memory;
  an output interface that facilitates outputting said first data, said updated information and a second data from said portable device,
  wherein the data is manipulated internally and integrated through at least one of a linear, or multi-level, cross-access texotrix methodology to provide up-to-the minute operating information; and
  wherein an operator can access the means for data manipulation and manipulate said data at any point;
  wherein the device can manipulate data in a non-linear algorithm, aggregating and sorting choices;
  wherein the device interfaces with and manipulates an operating system of the aircraft.

2. The system of claim 1 wherein said software comprises means of accessing said first data, said updated information, said second data and functions by means of an application program interface.

3. The system of claim 1 wherein said application software comprises means of organizing said data by means of a search engine function.

4. The system of claim 1 further comprising a communications means whereby said portable device communicates with data sources remote from said device while said portable device is en route.

5. The system of claim 1 wherein said data input receiver enables said portable device to receive data using wireless communications.

6. The system of claim 1 wherein said data delivery means for delivering said data to said portable device is by means of an Intranet.

7. The system of claim 1 wherein said data delivery means for delivering said data to said portable device is by means of the Internet.

8. The system of claim 1 wherein the application software renders first data, said updated information, said second data and functions by means of an HTML browser format.

9. The system of claim 1 wherein said portable device includes a flight planning component comprising;
  a flight planning applications software program;
  inputted a first flight data;
  an output data capability which is connected to an aircraft operating system, wherein said output data capability facilitates outputting a second flight data;
  a continuous data update capability.

10. The system of claim 1 wherein said portable device further comprises an external power source connection capability.

11. The system of claim 1 wherein said portable device further comprises data communications means for establishing data communication links between said portable device and disparate data sources.

12. The system of claim 1 wherein said portable device further comprises a means of ascertaining position.

13. The system of claim 1 wherein said portable device further comprises a means of terrain mapping.

14. The system of claim 1 wherein said portable device further comprises means permitting the user to access and manipulate said data and programs by means of peripheral devices comprising;
  peripheral ports;
  peripheral hardware; and,
  peripheral device drivers.

15. The system of claim 1 wherein the portable device further comprises a timing mechanism.

16. The system of claim 1 wherein said programs specifically include application program interfaces and search engine routines as the means of relating and aggregating data.

17. The system of claim 1 which includes construction characteristics of at least one of a tablet, ergonomic knee-top computer, hands free device, or interactive headgear.

18. The system of claim 1 wherein said portable device is used in conjunction with vehicles other than aircraft.

19. The system of claim 1 wherein said portable device further comprises a means of weather mapping, including generating and displaying weather maps from raw data, displaying generated or transmitted maps, and/or overlaying such maps upon other images, such as moving map displays or flight instruments.

20. The system of claim 1 wherein a translucent display screen facilitates overlaying display information directly over at least one of a primary display screen, maps and charts, in the manner of a heads-up display, or display glasses, or display visor.

21. The system of claim 1 which is formatted for use by at least one of: an end user; an intermediate user; by a user through an aircraft system; or directly from the device to an aircraft system or autopilot.

22. The system of claim 1 similarly constructed for alternate end-user and operators, including: captains, pilots, commanders, drivers, dispatchers, and operations personnel of boats/ships, automobiles, aircraft, spacecraft, and other transportation devices.

23. The system of claim 1 which relies on external rather than internal memory for at least one of programs, computing and storage.

24. The system of claim 1 which offers input offline or online via at least one of a keyboard, touchpad, touchscreen, memory device, voice recognition, short-cut key, mouse, roller-ball, hardwired device, wireless device, radio, eye-lock, heat recognition, analog, digital, scanning, and any accessible and compatible means, internet and intranet systems included.

25. The system of claim 1 which offers output offline or online available directly or indirectly, electronically or graphically, via at least one of a screen, standard display, heads-up display, printer, electronic voice, or through associated systems by way of cable modem, wireless, electronic, or any available transfer system.

* * * * *